US012417550B2

(12) United States Patent
Duong et al.

(10) Patent No.: US 12,417,550 B2
(45) Date of Patent: *Sep. 16, 2025

(54) METHODS AND APPARATUS OF BRAIN-LIKE IN-PIXEL INTELLIGENT PROCESSING SYSTEM

(71) Applicant: ADAPTIVE COMPUTATION LLC, La Verne, CA (US)

(72) Inventors: Tuan A Duong, La Verne, CA (US); Guangdao Duong, La Verne, CA (US)

(73) Assignee: ADAPTIVE COMPUTATION LLC, La Verne, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 18/227,923

(22) Filed: Jul. 29, 2023

(65) Prior Publication Data
US 2024/0404097 A1    Dec. 5, 2024

Related U.S. Application Data

(63) Continuation of application No. 18/205,643, filed on Jun. 5, 2023.

(51) Int. Cl.
*G06T 7/70*    (2017.01)
*G06V 10/25*    (2022.01)
(Continued)

(52) U.S. Cl.
CPC ............... *G06T 7/70* (2017.01); *G06V 10/25* (2022.01); *G06V 10/44* (2022.01); *G06V 10/82* (2022.01); *G06V 2201/07* (2022.01)

(58) Field of Classification Search
CPC .......... G06T 7/70; G06V 10/25; G06V 10/44; G06V 10/82; G06V 2201/07; G06V 10/764; G06V 10/454
(Continued)

(56) References Cited

U.S. PATENT DOCUMENTS 10,824,230 B1 *  11/2020  Yapici ................. A61B 5/1495
2019/0279681 A1 *  9/2019  Yuan ....................... G06V 20/64

FOREIGN PATENT DOCUMENTS

CA          2944908 C  *  6/2020  ........... G06F 1/3206

\* cited by examiner

*Primary Examiner* — Charlotte M Baker
(74) *Attorney, Agent, or Firm* — Ming Jiang; MM IP SERVICES LLC

(57) ABSTRACT

Aspects of present disclosure relates to a brain-like in-pixel intelligent processing system having in-pixel processing array, feature vector generator, neural network processor, and region and object of interest identifier. Each in-pixel processing unit includes photogate sensor to acquire image, average circuit to generate P element, subtraction circuit to generate F element, and absolute circuit to generate LGN element. Feature vector generator generates P, F, and LGN feature vectors from certain selected in-pixel processing units of in-pixel processing array selected according to saccadic eye movement algorithm. Neural network processor processes P, F, and LGN feature vectors and detects object, recognizes object, and determines location of object. Region and object of interest identifier identifies region and object of interest from object, and provides feedback of identified region and object of interest and processed P, F, and LGN feature vectors to the in-pixel processing array to improve the object detection and identification.

20 Claims, 11 Drawing Sheets

(51) Int. Cl.
*G06V 10/44* (2022.01)
*G06V 10/82* (2022.01)

(58) Field of Classification Search
USPC .......................................................... 382/103
See application file for complete search history.

METHODS AND APPARATUS OF BRAIN-LIKE IN-PIXEL INTELLIGENT PROCESSING SYSTEM

STATEMENT REGARDING FEDERALLY SPONSORED RESEARCH OR DEVELOPMENT

This invention was made with Government support under Agreement No. HR00112190117, awarded by DARPA. The Government has certain rights in the invention.

STATEMENT OF DOMESTIC PRIORITY

The application claims priority to and the benefit of U.S. patent application Ser. No. 18/205,643, entitled "Methods and Apparatus of Brain-Like In-Pixel Intelligent Processing System", filed Jun. 5, 2023 by Tuan A. Duong and QuangDao Duong, which is herein incorporated by reference in its entirety.

FIELD

The present disclosure generally relates to image acquisition and processing, and more particularly to an in-pixel processing array for image acquisition and processing, object detection, classification and tracking in a brain-like in-pixel intelligent processing system built on a semiconductor chip and methods of using the brain-like in-pixel intelligent processing system.

BACKGROUND

Full color image looks very satisfied via our visual systems, however, there are overwhelmed data for a computer system to digest. The immediate price to pay includes: huge amount of data processing, large time delay, difficult to process in real time, more computer power to burn for object detection, classification and tracking, therefore, it may pose its difficulties for edge, mobile tasks.

On the other hand, researches have shown that human visual systems are versatile and flexible, capable of identifying objects in a dynamic real-world environment. Rapid and accurate object recognition is achieved even though parts of the human visual system (e.g., eyes) may be fatigued, humans are unable to process detailed information at high speeds, there is limited object information to process, and/or the inability to memorize large amount of information at any given time. Saccadic eye movement is one of the bio-inspired visual models that may be emulated to extract features from captured image data based on a biological visual pathway, such as by emulating a periphery, a fovea, and a lateral geniculate nucleus of a vertebrate. The processing requirement is in the pixel level; hence it is necessary to develop a brain-like in-pixel intelligent processing system to achieve rapid and accurate object recognition by humans.

Therefore, heretofore unaddressed needs still exist in the art to address the aforementioned deficiencies and inadequacies.

SUMMARY

In one aspect, the present disclosure relates to an in-pixel processing array for a brain-like in-pixel intelligent processing system. In certain embodiments, the in-pixel processing array includes: a set of in-pixel processing units, a saccadic pixel column selector, and a saccadic pixel row selector for selecting an output from selected in-pixel processing units according to a saccadic eye movement algorithm based on an acquired image. The in-pixel processing array forms an image acquisition and bio-inspired processing imager configured to processes raw gray information in a pixel level. An output of the in-pixel processing array is from a set of selected in-pixel processing units of the in-pixel processing array, and the set of selected in-pixel processing units of the in-pixel processing array is selected according to the saccadic eye movement algorithm based on the acquired image.

In certain embodiments, each of the in-pixel processing units includes: a photogate sensor, an average circuit, a subtraction circuit, and an absolute circuit. The photogate sensor captures a pixel of the image of an object corresponding to the in-pixel processing unit and produces an $I_{out}$ current of the in-pixel processing unit to the in-pixel processing array. The average circuit receives and averages $I_{out}$ current from photogate sensor of the in-pixel processing unit and $I_{out}$ current from photogate sensors of a set of neighboring in-pixel processing units around the in-pixel processing unit, and the averaged $I_{out}$ current from the in-pixel processing unit and the set of neighboring in-pixel processing units forms a periphery (P) element of the in-pixel processing unit. The periphery (P) element formed is used by the subtraction circuit to generate a fovea (F) element of the in-pixel processing unit. The F element generated in pixel level is sent to the absolute circuit via pixel mapping to generate lateral geniculate nucleus (LGN) element of the in-pixel processing unit.

In certain embodiments, the set of in-pixel processing units of the in-pixel processing array includes: N columns, and M rows of in-pixel processing units, where N is a positive integer, and M is a positive integer. The set of neighboring in-pixel processing unit of the selected in-pixel processing units is centered at the selected in-pixel processing unit in a form of sub-window array. The set of neighboring in-pixel processing units around the in-pixel processing unit is centered at the in-pixel processing unit in a form of sub-window array. The sub-window array of the set of neighboring in-pixel processing units around the selected in-pixel processing unit includes: a circle, a square, a hexagon, and an octagon.

In certain embodiments, each of the in-pixel processing units includes: a set of input channels. The set of input channels of the in-pixel processing unit includes: a first input channel from the in-pixel processing unit, a second input channel from the first neighboring in-pixel processing unit, a third input channel from the second neighboring in-pixel processing unit, . . . , and a Q-th input channel from the (Q–1)-th neighboring in-pixel processing unit.

In certain embodiments, the P element in current mode of the selected in-pixel processing unit from the average circuit is parallelly delivered in an array form through a periphery sub-window array.

In certain embodiments, the F element in current mode of the selected in-pixel processing unit from the subtraction circuit is parallelly delivered in an array form through a fovea sub-window array.

In one embodiment, the LGN element in current mode of the selected in-pixel processing unit from the absolute circuit is parallelly delivered in an analog array form through a LGN feature sub-window array. In another embodiment, the LGN element in current mode of the selected in-pixel processing unit from the absolute circuit is parallelly delivered off chip in a digital array form over an Analog to Digital Converter (ADC) array through the LGN feature sub-window array.

In another aspect, the present disclosure relates to a brain-like in-pixel intelligent processing system. In certain embodiments, the brain-like in-pixel intelligent processing system includes: an in-pixel processing array, a feature vector generator, a neural network processor, and a region and object of interest identifier. The in-pixel processing array includes a set of in-pixel processing units, a saccadic pixel column selector, and a saccadic pixel row selector for select the output from selected in-pixel processing units according to a saccadic eye movement algorithm based on an acquired image, and each of the in-pixel processing units includes: a photogate sensor for capturing a pixel of an image of an object and produces an $I_{out}$ current to the in-pixel processing array, an average circuit for receiving and averaging $I_{out}$ current from the in-pixel processing unit and a set of neighboring in-pixel processing units around the in-pixel processing unit, and an averaged $I_{out}$ current forms a periphery (P) element of the in-pixel processing unit, the periphery (P) element of the in-pixel processing unit formed is used by the subtraction circuit to generate a fovea (F) element of the in-pixel processing unit, and the F element of the in-pixel processing unit generated in pixel level is sent to the absolute circuit via pixel mapping to generate lateral geniculate nucleus (LGN) element of the in-pixel processing unit. The in-pixel processing array forms an image acquisition and bio-inspired processing imager configured to processes raw gray information in a pixel level. An output of the in-pixel processing array is from a set of selected in-pixel processing units of the in-pixel processing array, and the set of selected in-pixel processing units of the in-pixel processing array is selected according to the saccadic eye movement algorithm based on the acquired image.

In certain embodiments, each of the set of selected in-pixel processing units produces a periphery (P) element, a fovea (F) element, and a lateral geniculate nucleus (LGN) element of the in-pixel processing unit, the feature vector generator generates a P feature vector, an F feature vector, and an LGN feature vector of the in-pixel processing array of the image of an object from the P element, the F element, and the LGN element of each of the set of selected in-pixel processing units received, the neural network processor receives and processes the P feature vector, the F feature vector, and the LGN feature vector of the in-pixel processing array, detects the object, recognizes the object, and determines the location of the object, and the region and object of interest identifier provides feedback of the region and the object of interest to the in-pixel processing array to improve the object detection and identification.

In certain embodiments, each selected in-pixel processing unit uses the average circuit to average the $I_{out}$ current from photogate sensor of the selected in-pixel processing unit and $I_{out}$ current from photogate sensors from a set of neighboring in-pixel processing unit around the selected in-pixel processing unit to generate a periphery (P) element of the selected in-pixel processing unit.

In certain embodiments, the set of neighboring in-pixel processing unit around the selected in-pixel processing unit is centered at the selected in-pixel processing unit in a form of sub-window array. The sub-window array of the set of neighboring in-pixel processing units around the selected in-pixel processing unit is in a circle form, a square form, a hexagon form, and an octagon form.

In certain embodiments, the P element in current mode of the selected in-pixel processing unit from the average circuit is parallelly delivered in an array form through a periphery sub-window array.

In certain embodiments, the F element in current mode of the selected in-pixel processing unit from the subtraction circuit is parallelly delivered in an array form through a fovea sub-window array.

In one embodiment, the LGN element in current mode of the selected in-pixel processing unit from the absolute circuit is parallelly delivered in an analog array form through a LGN feature sub-window array. In another embodiment, the LGN element in current mode of the selected in-pixel processing unit from the absolute circuit is parallelly delivered off chip in a digital array form over an Analog to Digital Converter (ADC) array through the LGN feature sub-window array.

In yet another aspect, the present disclosure relates to a method of using a brain-like in-pixel intelligent processing system. In certain embodiments, the method includes one of more of the following operations:

exposing an object to the brain-like in-pixel intelligent processing system, the brain-like in-pixel intelligent processing system includes: an in-pixel processing array configured to acquire raw gray information of the object, and to process the raw gray information acquired in a pixel level, a feature vector generator, a neural network processor, and a region and object of interest identifier, the in-pixel processing array includes a set of in-pixel processing units and each of the in-pixel processing units includes a photogate sensor, an average circuit, a subtraction circuit, and an absolute circuit;

producing, by the photogate sensor of a set of selected in-pixel processing units of the in-pixel processing array, an $I_{out}$ current of each selected in-pixel processing unit in response to the exposure to the object, the set of selected in-pixel processing units of the in-pixel processing array is selected according to a saccadic eye movement algorithm based on an acquired image;

averaging, by the average circuit of each of the set of selected in-pixel processing units, the $I_{out}$ current from the selected in-pixel processing unit and a set of neighboring in-pixel processing units around the selected in-pixel processing unit to generate a periphery (P) element of each selected in-pixel processing unit;

subtracting, by the subtraction circuit of each of the set of selected in-pixel processing units, the P element from the each of the set of selected in-pixel processing units to generate a corresponding fovea (F) element of each selected in-pixel processing units;

producing, by the absolute circuit of each of the set of selected in-pixel processing units, a corresponding lateral geniculate nucleus (LGN) element for each of the set of selected in-pixel processing units from each of the corresponding F elements of the set of selected in-pixel processing units;

generating, by the feature vector generator of the brain-like in-pixel intelligent processing system, a corresponding P feature vector, F feature vector, and LGN feature vector from each of the corresponding P elements, F elements, and LGN elements of each of the set of selected in-pixel processing units;

processing, by the neural network processor, the P feature vector, the F feature vector, and the LGN feature vector of the set of selected in-pixel processing units to detect the object, identify the object, and obtain the location of the object;

identifying, by the region and object of interest identifier, the region and object of interest from the processed P, F, and LGN feature vectors of the brain-like in-pixel intelligent processing system; and transmitting, by the region and object of interest identifier, the identified region and object of interest and the processed P, F, and LGN feature vectors of the brain-like in-pixel intelligent processing system back to in-pixel processing array to improve the object detection and identification.

In certain embodiments, the brain-like in-pixel intelligent processing system includes: the in-pixel processing array, the feature vector generator, the neural network processor, and the region and object of interest identifier. The in-pixel processing array includes a set of in-pixel processing units, and each of the in-pixel processing units includes: the photogate sensor for capturing a pixel of an image of an object and produces an $I_{out}$ current to the in-pixel processing array, the average circuit for receiving and averaging $I_{out}$ current from the in-pixel processing unit and a set of neighboring in-pixel processing units around the in-pixel processing unit and an averaged $I_{out}$ current forms a periphery (P) element, the periphery (P) element formed is used by the subtraction circuit to generate a fovea (F) element of the in-pixel processing unit; and the F element generated in pixel level is sent to the absolute circuit via pixel mapping to generate lateral geniculate nucleus (LGN) element of the in-pixel processing unit.

In certain embodiments, the in-pixel processing array forms an image acquisition and bio-inspired processing imager configured to processes raw gray information in a pixel level. An output of the in-pixel processing array is from a set of selected in-pixel processing units of the in-pixel processing array, and the set of selected in-pixel processing units of the in-pixel processing array is selected according to the saccadic eye movement algorithm based on the acquired image.

In certain embodiments, the feature vector generator receives and processes the P element, the F element, and the LGN element from each of selected in-pixel processing units of the in-pixel processing array, and generates the P feature vector, the F feature vector, and the LGN feature vector of the in-pixel processing array. The neural network processor receives and processes the P feature vector, the F feature vector, and the LGN feature vector of the in-pixel processing array received. The region and object of interest identifier identifies the region and object of interest from the processed P, F, and LGN feature vectors of the in-pixel processing array.

In certain embodiments, each of set of selected in-pixel processing units produces a periphery (P) element, a fovea (F) element, and a lateral geniculate nucleus (LGN) element for the selected in-pixel processing unit, the feature vector generator generates a P feature vector, an F feature vector, and an LGN feature vector of the in-pixel processing array of an image of an object from the P element, the F element, and the LGN element of each of the set of selected in-pixel processing units received, the neural network processor receives and processes the P feature vector, the F feature vector, and the LGN feature vector of the in-pixel processing array, detects the object, recognizes the object, and determines the location of the object, and the region and object of interest identifier provides feedback of the region and the object of interest to the in-pixel processing array to improve the object detection and identification.

In certain embodiments, each of the set of selected in-pixel processing unit uses the average circuit to average the $I_{out}$ current from the photogate sensor of the selected in-pixel processing unit and $I_{out}$ current from photogate sensors from a set of neighboring in-pixel processing unit around the selected in-pixel processing unit to generate a periphery (P) element of the selected in-pixel processing unit, the set of neighboring in-pixel processing unit of the selected in-pixel processing unit is centered at the selected in-pixel processing unit in a form of sub-window array, and the sub-window array of the set of neighboring in-pixel processing units of the selected in-pixel processing unit includes: a circle, a square, a hexagon, and an octagon.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein.

DETAILED DESCRIPTION

Figure 1:
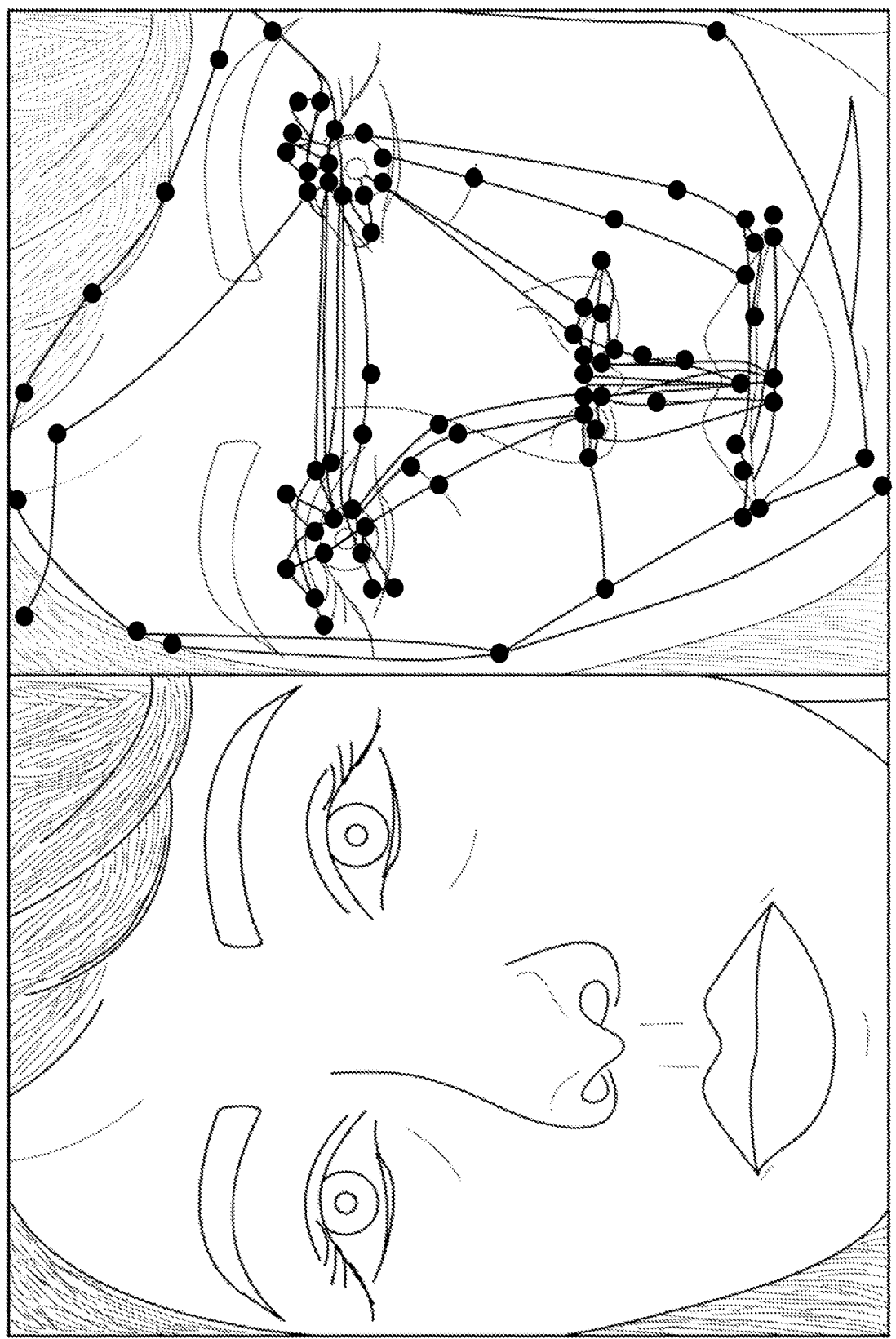
FIG. 1 illustrates an image of female face on the left and the dots and traces on the right illustrate saccadic eye movement when human eyes look at the female face according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments disclosed herein provide systems and methods for object recognition in image or video data. The example embodiments may be considered to be a bio-inspired model that emulates saccadic eye movements and extracts features from captured image data based on a biological visual pathway, such as by emulating the retina, fovea, and lateral geniculate nucleus (LGN) of a vertebrate. In embodiments, an input image is provided to a saccadic eye emulator that may sequentially scan the input image to focus on one or more objects of interest and/or features within the object (e.g., when the input image includes a person, the saccadic eye emulator may focus on the eyes, nose, lips, etc., of the face of the person). Statistical data of components within the object (e.g., one or more features) may be constructed from different locations of different light intensity of the input image. In embodiments, the saccadic eye emulator generates a set of images or blocks in different locations of the input image. Principal component analysis (PCA) and/or feature extraction algorithms (FEA) may be used to obtain vertebrate features and fovea features, which are based on vertebrate retina horizontal cells and retinal ganglion cells, respectively.

Example embodiments disclosed herein further provide systems and methods for identifying whole objects based on one or more (partial) object images. The bio-inspired model for extracting vertebrate features, fovea features, and LGN features is used to process one or both of the input images that form the query request and the stored images of objects in a database from which the query results will be obtained. In some embodiments, one or more searches are conducted in the stored images in the database for each image of the input images that form the query request independently of other images of the input images. And then the results of such independent searches are analyzed to determine best matches to the combination of all of the images forming the query request.

The present disclosure will now be described more fully hereinafter with reference to the accompanying drawings FIGS. 1 through 12, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Researches have shown that human visual systems are versatile and flexible, capable of identifying objects in a dynamic real-world environment. Rapid and accurate object recognition is achieved even though parts of the human visual system (e.g., eyes) may be fatigued, humans are unable to process detailed information at high speeds, there is limited object information to process, and/or the inability to memorize large amount of information at any given time. Saccadic eye movement is one of the bio-inspired visual models that may be emulated to extract features from captured image data based on a biological visual pathway, such as by emulating a periphery, a fovea, and a lateral geniculate nucleus of a vertebrate. The processing requirement is in the pixel level; hence it is necessary to develop a brain-like in-pixel intelligent processing system to achieve rapid and accurate object recognition by humans.

In certain embodiments, as shown in FIG. 1, an image of female face is shown on the left half, and dots and traces are shown on the right half illustrate saccadic eye movement when human eyes look at the female face. Human can identify the female face based only on the much-reduced amount of data points represented by the dots and traces instead of every single pixel of the image. It appears that the dots are concentrated in feature rich area such as eyes, hair lines, nose, mouth and lips, and profile lines, as well as the spatial relationship among all these data points. It allows human to sufficiently recognize and identify the female face with such as small number of data points. Emulating the saccadic eye movement of human eyes enables a brain-like in-pixel intelligent processing system to process much less data, fast data processing and autonomous operation to facilitate the real-time feedback mechanism for adaptive learning to pave the way for machine intelligence.

Figure 2:
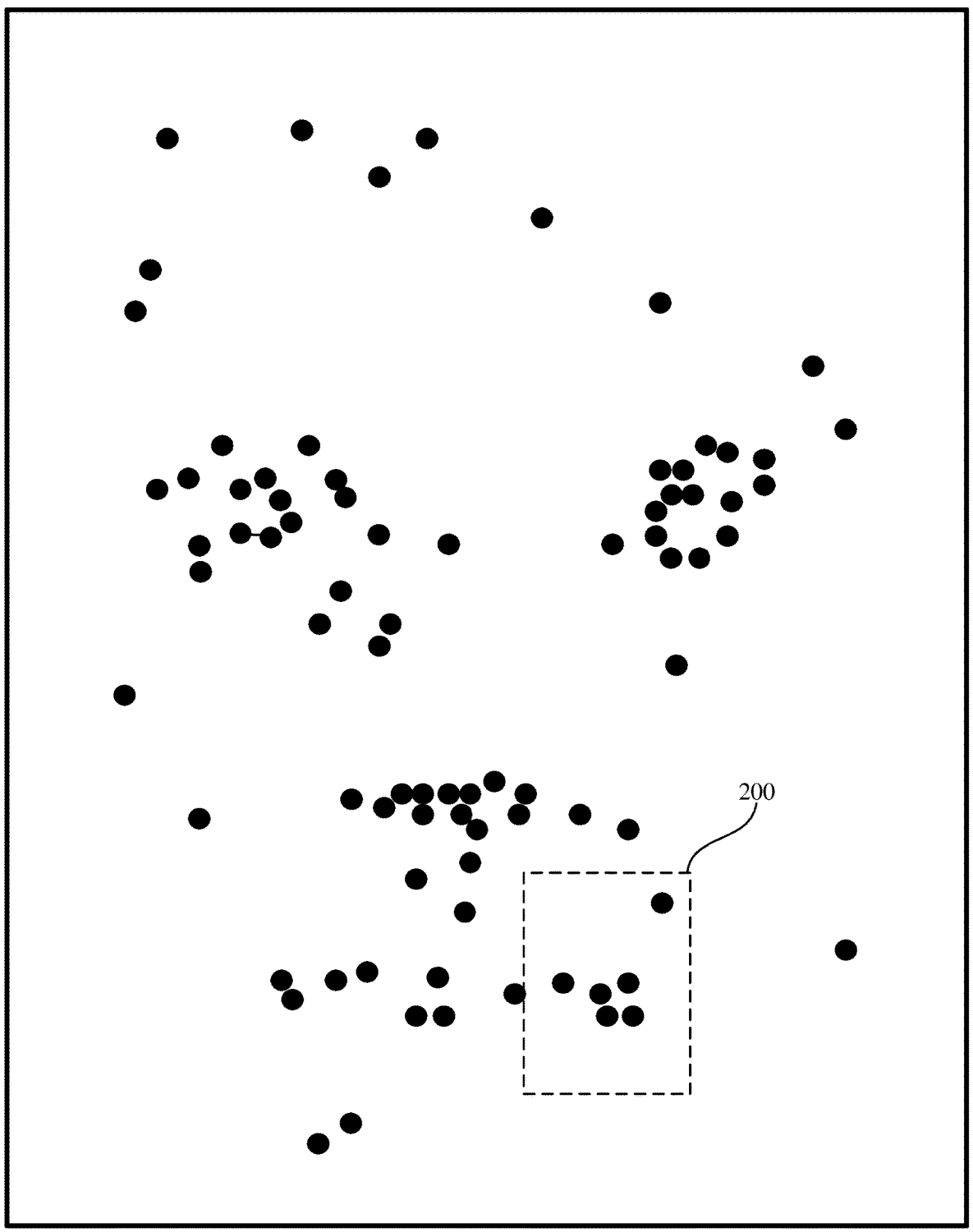
FIG. 2 shows that when looking at the female face, the human eyes only stop at these dotted locations according to certain embodiments of the present disclosure.

As shown in FIG. 2, the data points represented by the dots are sufficient for a human to recognize and identify the female face are extracted and displayed according to certain embodiments of the present disclosure.

In one aspect, as shown in FIGS. 1-9, the present disclosure relates to an in-pixel processing array 12 for a brain-like in-pixel intelligent processing system 10. In certain embodiments, the in-pixel processing array 12 and the brain-like in-pixel intelligent processing system 10 is built on a semiconductor chip. In certain embodiments, the in-pixel processing array 12 includes: a set of in-pixel processing units 100, a saccadic pixel selection circuit 1202. The saccadic pixel selection circuit 1202 includes: a saccadic pixel column selector 12022 and a saccadic pixel row selector 12024. The in-pixel processing array 12 forms an image acquisition and bio-inspired processing imager configured to processes raw gray information in a pixel level. An output of the in-pixel processing array 12 is from a set of selected in-pixel processing units 100 of the in-pixel processing array 12. The set of selected in-pixel processing units 100 of the in-pixel processing array 12 is selected through the saccadic pixel column selector 12022 and the saccadic pixel row selector 12024 according to a saccadic eye movement algorithm based on an acquired image.

Figure 3:
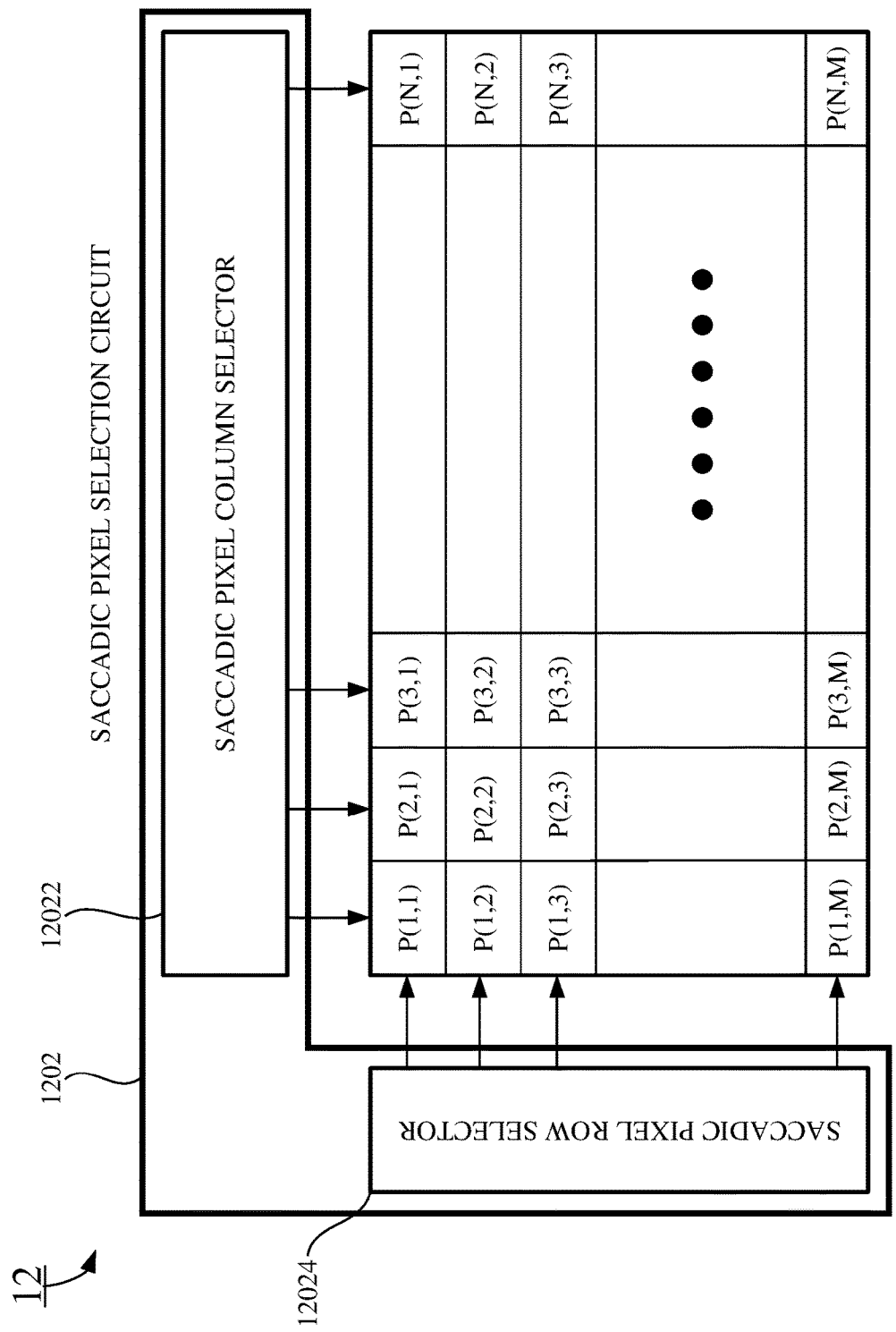
FIG. 3 illustrates an exemplary in-pixel processing array and a saccadic pixel selection circuit having a saccadic pixel column selector and a saccadic row selector for selecting an output of the selected in-pixel processing units of the in-pixel processing array to off-chip according to certain embodiments of the present disclosure.

In certain embodiments, as shown in FIG. 3, the in-pixel processing array 12 includes has N columns and M rows of in-pixel processing units 100 P(N, M), where N and M are positive integer, P(1, 1), P(1, 2), P(1, 3), . . . , and P(N, M). The in-pixel processing array 12 forms the image acquisition and bio-inspired processing imager configured to processes raw gray information in the pixel level.

Figure 4:
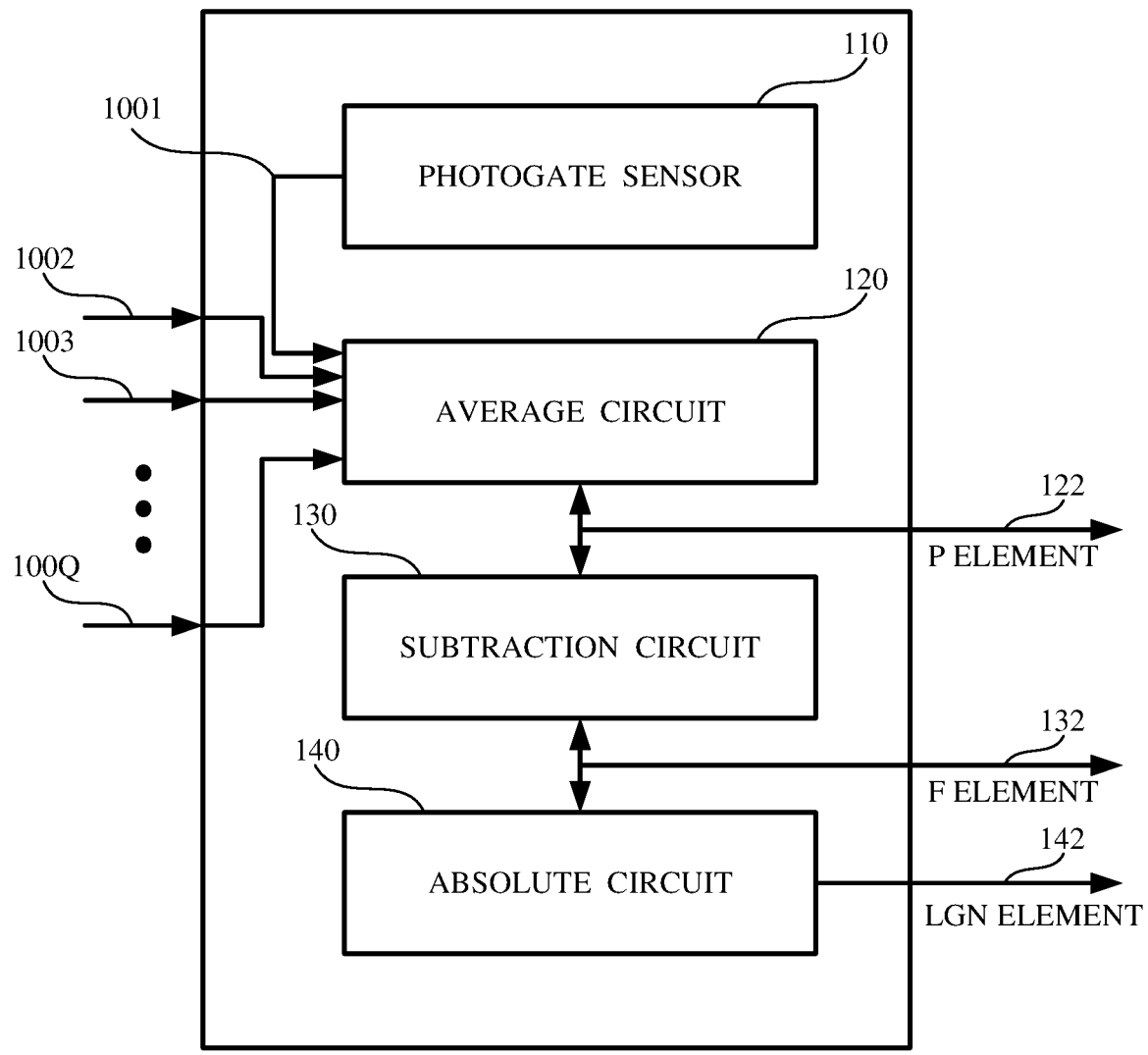
FIG. 4 shows a block diagram of an exemplary in-pixel processing unit according to certain embodiments of the present disclosure.

In certain embodiments, as shown in FIG. 4, each of the in-pixel processing unit 100 includes: a photogate sensor 110, an average circuit 120, a subtraction circuit 130, and an absolute circuit 140. The photogate sensor 110 captures a pixel of the image of an object corresponding to the in-pixel processing unit 100 and produces an $I_{out}$ current of the in-pixel processing unit 100 to the in-pixel processing array 12. The average circuit 120 receives and averages $I_{out}$ current from photogate sensor of the in-pixel processing unit 100 and a set of neighboring in-pixel processing units 100 around the in-pixel processing unit 100. The averaged $I_{out}$ current from the in-pixel processing unit 100 and the set of neighboring in-pixel processing units 100 forms a periphery (P) element 122 of the in-pixel processing unit 100.

Figure 5:
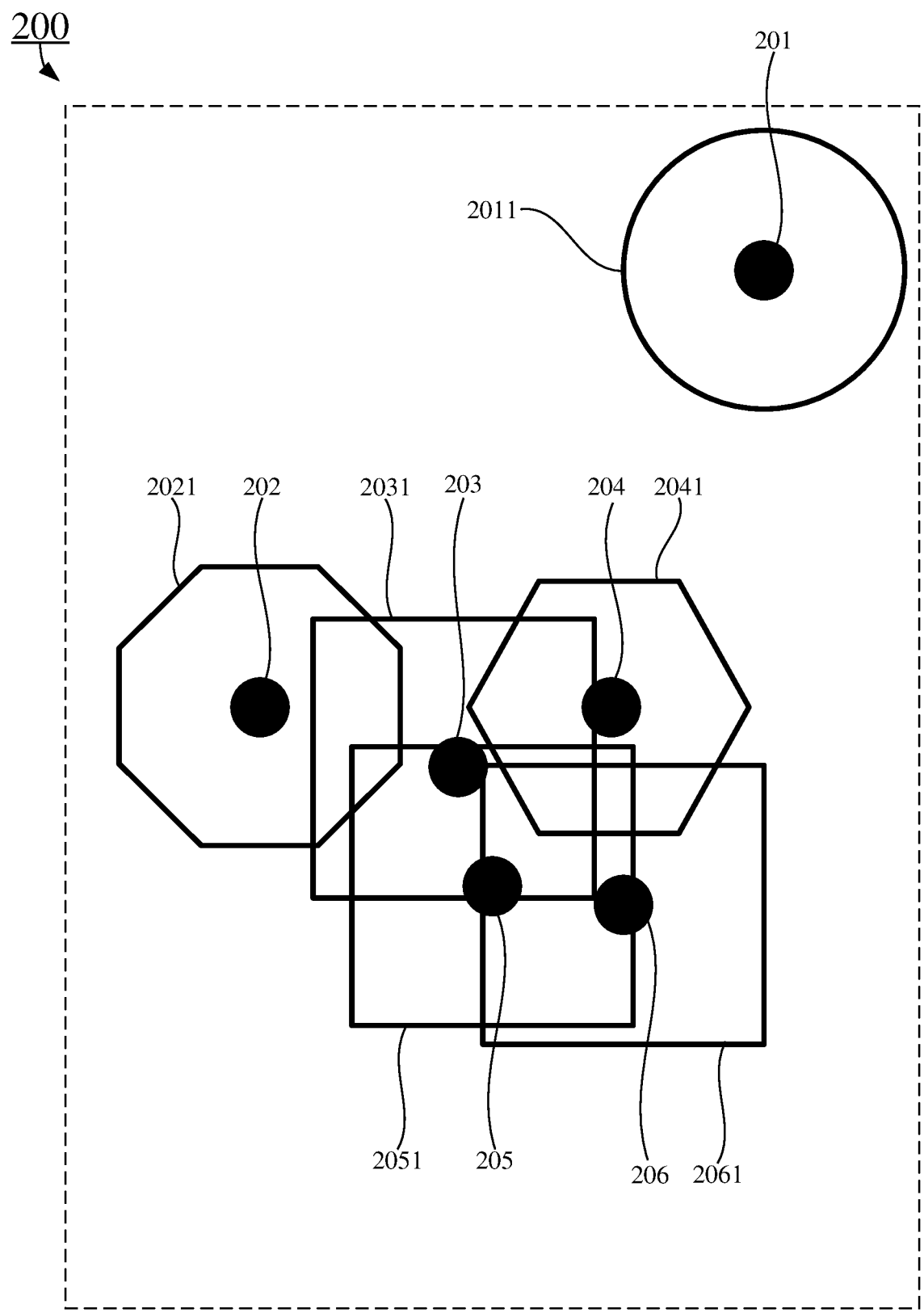
FIG. 5 illustrates a highlighted portion of FIG. 2 with saccadic eye movement exemplary sub-windows of neighboring in-pixel processing units of selected in-pixel processing units in different shapes according to certain embodiments of the present disclosure.

In certain embodiments, as shown in FIG. 4, the average circuit 120 receives the $I_{out}$ current from photogate sensor 110 of a selected in-pixel processing unit 100 itself through an input channel 1001, and the $I_{out}$ current from a set of neighboring in-pixel processing units around the selected in-pixel processing unit 100 through a set of input channels 1002, . . . , and 100Q, where Q is a positive integer. As shown in FIG. 5, the average circuit 120 averages the Q channels of $I_{out}$ current from itself as well as the group of neighboring in-pixel processing units. The averaged Q channels of Iot current forms a periphery (P) element 122 and the P element 122 represents emulated saccadic eye movements of the in-pixel processing array 12.

In certain embodiments, the P element 122 of the selected in-pixel processing unit 100 generated is an input to the subtraction circuit 130 and the output of the subtraction circuit 130 forms a fovea (F) element 132 of the selected in-pixel processing unit 100.

In certain embodiments, the F element 132 of the selected in-pixel processing unit 100 in pixel level generated is sent to the absolute circuit 140 via pixel mapping to form lateral geniculate nucleus (LGN) element 142 of the selected in-pixel processing unit 100.

In certain embodiments, the image captured by the in-pixel processing array 12 includes N columns and M rows of in-pixel processing units 100, but not all of the pixels captured is used for image processing, object recognition and identification. Only a set of selected in-pixel processing units 100 are used for image processing, object recognition and identification purposes. The set of selected in-pixel processing units 100 is selected according to a saccadic eye movement algorithm based on the acquired image by the in-pixel processing array 12 using the saccadic pixel column selector 12022 and the saccadic pixel row selector 12024 from the pixels of the acquired image.

In certain embodiments, the average circuit 120 of each selected in-pixel processing unit 100 receives and averages $I_{out}$ current from photogate sensor of the selected in-pixel processing unit 100 and a set of neighboring in-pixel processing units 100 around the selected in-pixel processing unit 100, as shown in FIG. 5. As shown in FIG. 2, the data points represented by the dots are sufficient for a human to recognize and identify the female face are extracted and displayed according to certain embodiments of the present disclosure. The saccadic eye movement algorithm is used by the saccadic pixel column selector 12022 and the saccadic pixel row selector 12024 to select these dots as shown in FIG. 2. FIG. 5 shows six selected in-pixel processing units: 201, 202, 203, 204, 205, and 206. In one embodiment, the selected in-pixel processing unit 201 is at a center of a circle 2011, and the circle 2011 represents a set of neighboring in-pixel processing units around the selected in-pixel processing unit 201, therefore, the neighboring in-pixel processing units sub-window array is in a round shape. In another embodiment, the selected in-pixel processing unit 202 is at a center of an octagon 2021, and the octagon 2021 represents a set of neighboring in-pixel processing units around the selected in-pixel processing unit 202, therefore, the neighboring in-pixel processing units sub-window array is in an octagon shape. In another embodiment, the selected in-pixel processing unit 204 is at a center of a hexagon 2041, and the hexagon 2041 represents a set of neighboring in-pixel processing units around the selected in-pixel processing unit 204, therefore, the neighboring in-pixel processing units sub-window array is in a hexagon shape. In yet another embodiment, each of selected in-pixel processing units 203, 205, and 206 is at a center of squares 2031, 2051, and 2061, and the square 2031, 2051, and 2061 represent three sets of neighboring in-pixel processing units around selected in-pixel processing units 203, 205, and 206, therefore, the neighboring in-pixel processing units sub-window arrays are in a square shape.

Figure 6:
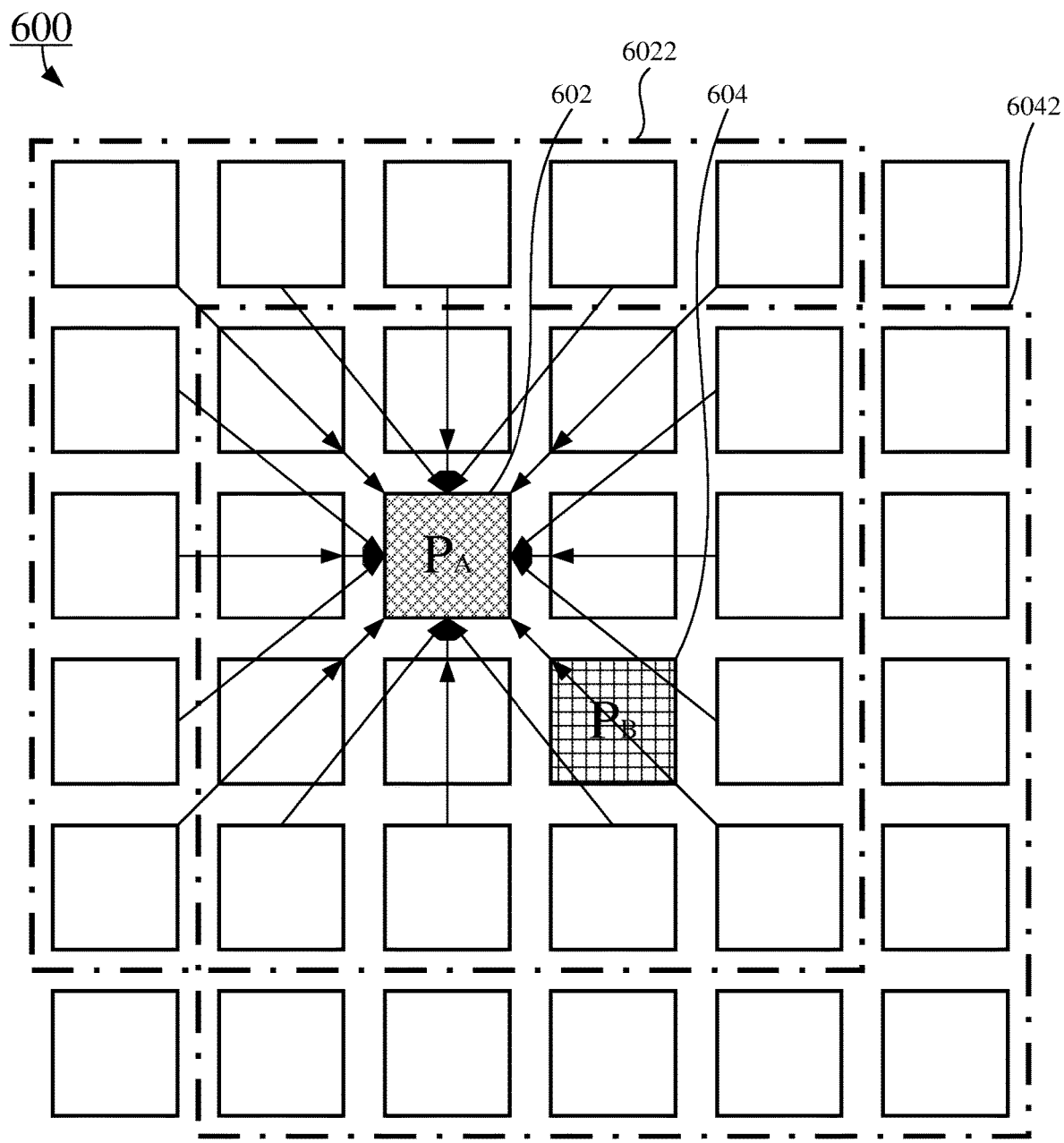
FIG. 6 illustrates Saccadic Eye Movement with a group 5-pixel array on the selected in-pixel processing units $P_A$ and $P_B$ (saccadic size 5×5 array) according to certain embodiments of the present disclosure.

In certain embodiments, as shown in FIG. 6, Saccadic Eye Movement with a group 5-pixel array on the selected in-pixel processing units $P_A$ (602), and $P_B$ (604) are surrounded with a saccadic size 5×5 square sub-window arrays. The $I_{out}$ currents from the selected in-pixel processing units $P_A$ (602), is averaged with $I_{out}$ currents from the neighboring in-pixel processing units of a first sub-windows array 6022. The $I_{out}$ currents from the selected in-pixel processing units $P_B$ (604), is averaged with $I_{out}$ currents from the neighboring in-pixel processing units of a second sub-windows array 6042. The arrows in FIG. 6 shows the local connectivity among the neighboring in-pixel processing units 100. This local connectivity allows the selected in-pixel processing unit $P_A$ to average the $I_{out}$ current from the selected in-pixel processing unit $P_A$ and the set of neighboring in-pixel processing units 100 around the selected in-pixel processing unit $P_A$. The averaged $I_{out}$ current from the selected in-pixel processing unit $P_A$ and the set of neighboring in-pixel processing units 100 around the selected in-pixel processing unit $P_A$ forms the periphery (P) element 122 of the selected in-pixel processing unit $P_A$. The periphery (P) element 122 of the selected in-pixel processing unit $P_A$ formed is used by the subtraction circuit 130 to generate a fovea (F) element 132 of the selected in-pixel processing unit $P_A$. The F element 132 generated in pixel level is sent to the absolute circuit 140 via pixel mapping to generate lateral geniculate nucleus (LGN) element 142 of the selected in-pixel processing unit $P_A$.

Figure 7:
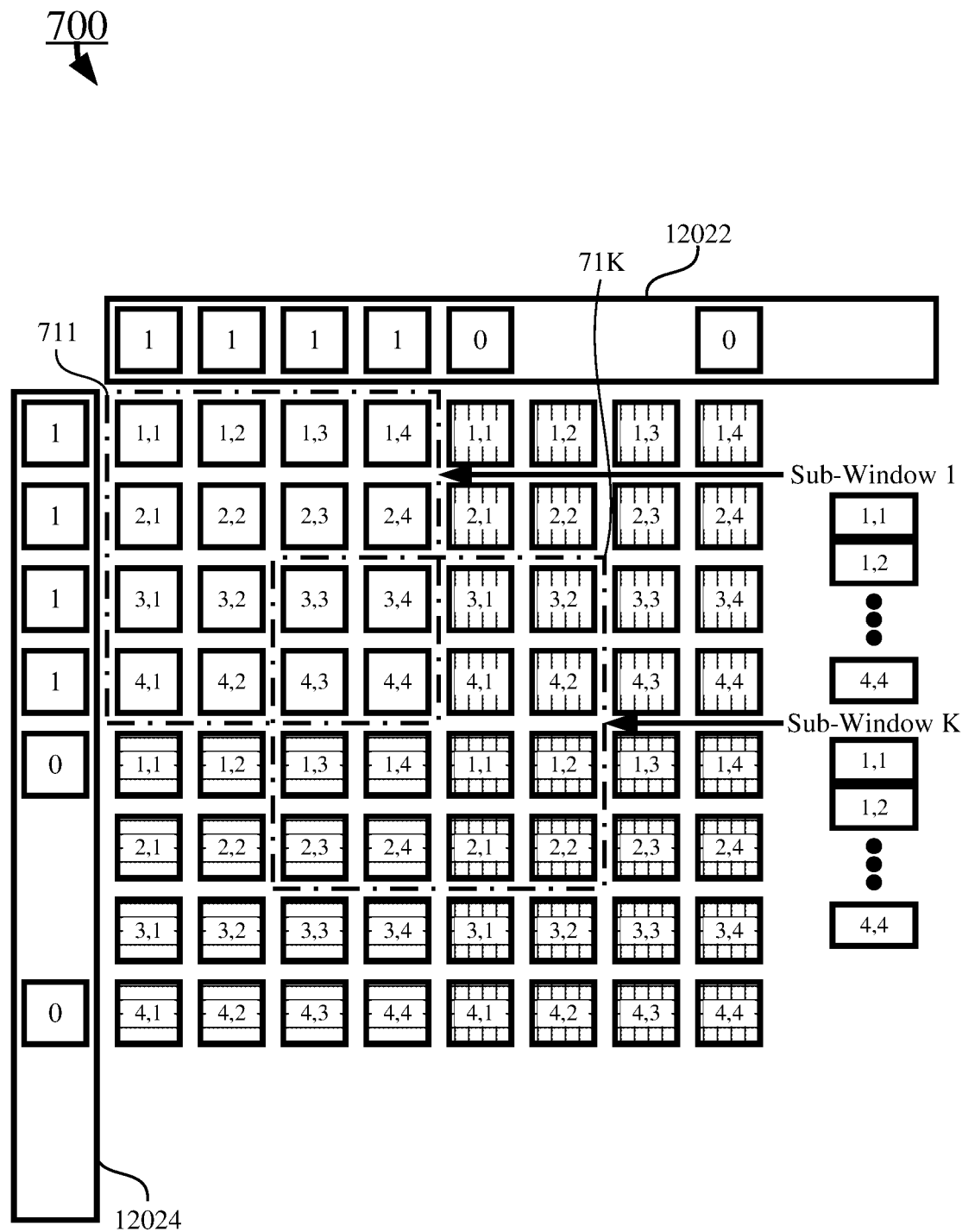
FIG. 7 illustrates a P element and F element pixel array read-out for exemplary sub-windows array of 4×4 neighboring in-pixel processing units according to certain embodiments of the present disclosure.

In certain embodiments, as shown in FIG. 7, a P elements and F elements Pixel array read-out is shown in FIG. 7 according to certain embodiments of the present disclosure. In FIG. 7, the in-pixel column selector 12022 and the in-pixel row selector 12024 are used to select an m×m 2-D array (i.e. 4×4) to read-out and the same index (i,j) shares the same data bus to avoid the pixel collision. This mapping is 1-1 of any m×m pixel array and the common data bus index (i, j) is resulted in a vector array (i,j), but it may not in the right order e.g., in sub-window K, the read-out is expected: (2, 3), (2, 4), (2, 1), (2, 2), (3, 3), (3, 4), (3, 1), (3, 2), (4, 3), (4, 4), (4, 1), (4, 2), (1, 3), (1, 4), (1, 1) and (1, 2). We need to re-correct this order via a switching array in FIG. 8 and the switching array can be controlled by a finite state machine or mapping memory block.

A first sub-window 1 is a 4×4 square sub-window array having 16 in-pixel processing units (1, 1), (1, 2), (1, 3), (1, 4), . . . and (4, 4), when the first four columns of the saccadic pixel column selector 12022 are switched on, and the first four rows of the saccadic pixel row selector 12024 are switched on. A K-th sub-window K is also a 4×4 square sub-window array having 16 in-pixel processing units (3, 3), (3, 4), (3, 1), (3, 2), . . . and (2, 2), when the third through sixth columns of the saccadic pixel column selector 12022 are switched on, and the third through sixth rows of the saccadic pixel row selector 12024 are switched on. In this case, each of the first sub-window 1 through the K-th sub-window K will includes 16 in-pixel processing units: (1, 1), (1, 2), (1, 3), (1, 4), (2, 1), (2, 2), (2, 3), (2, 4), (3, 1), (3, 2), (3, 3), (3, 4), (4, 1), (4, 2), (4, 3), and (4, 4).

Figure 8:
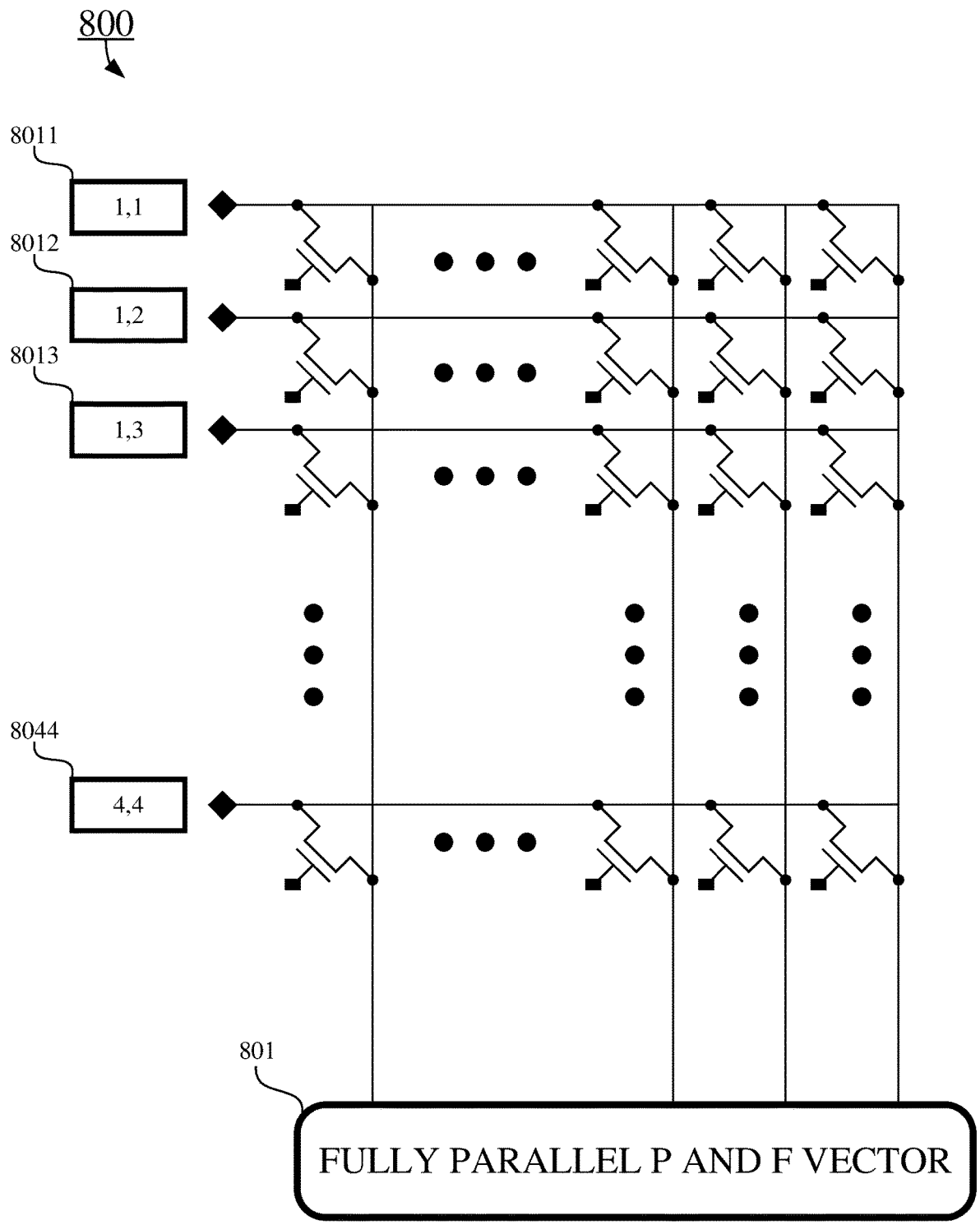
FIG. 8 illustrates a switching array to recorrect the P feature vector and the F feature vector order from fixed read-out mapping according to certain embodiments of the present disclosure.

In certain embodiments, a fully paralley read-out of P and F pixel array is shown in FIG. 8, according to certain embodiments of the present disclosure. The output of the P feature vector and F feature vector 801 is controlled by an array of switches, and these switches are controlled by a finite state machine to provide the P feature vector and F feature vector in a right vector order.

Figure 9:
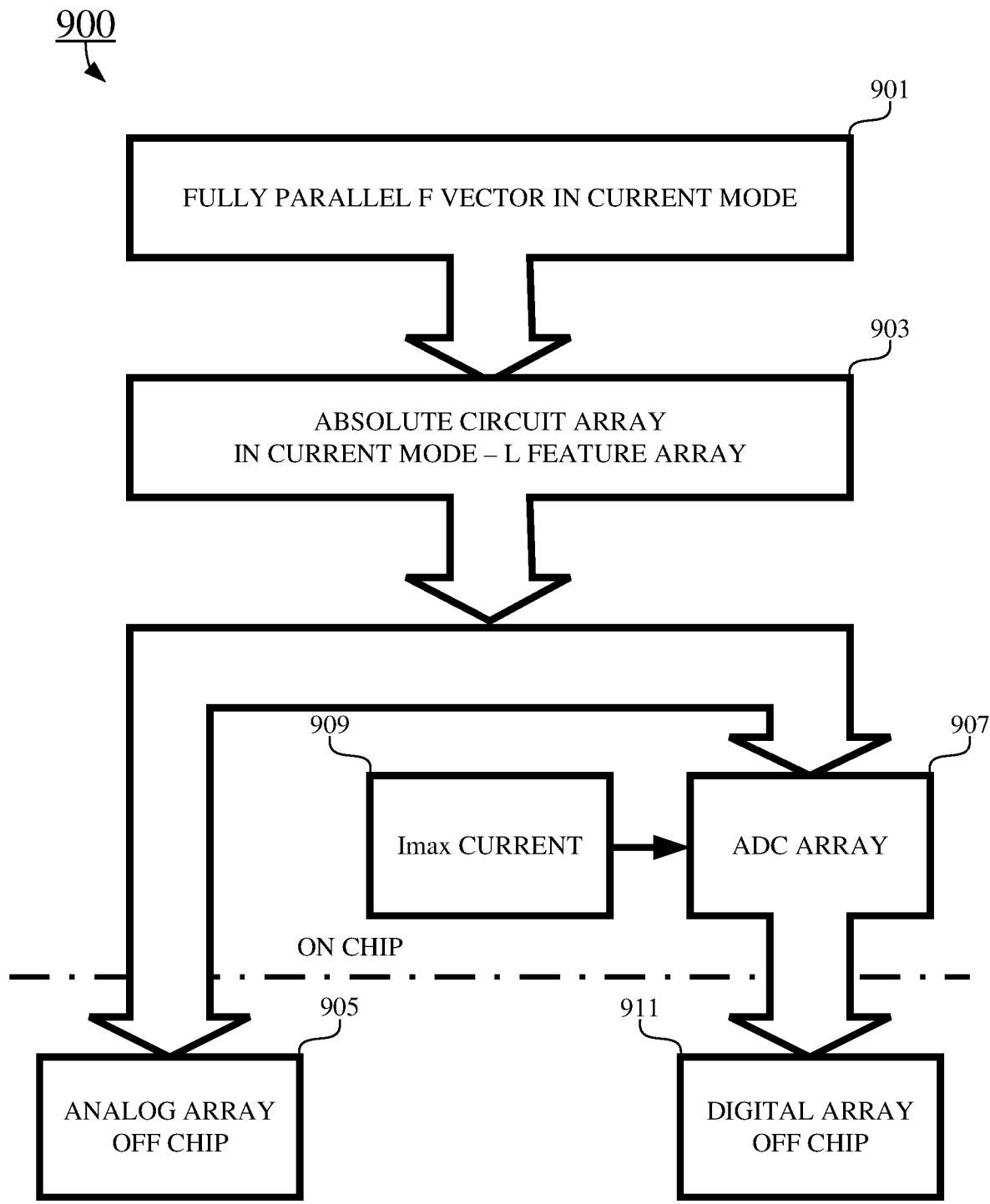
FIG. 9 illustrates a flow chart of output of the in-pixel processing array according to certain embodiments of the present disclosure.

In certain embodiments, a flow chart of output of the in-pixel processing array 12 is shown in FIG. 9 according to certain embodiments of the present disclosure.

At the block 901, the fully parallel F feature vector in current mode generated by an array of subtraction circuit 130 of the selected in-pixel processing unit 100 is parallelly delivered to an array of absolute circuit 140.

At the block 903, the fully parallel LGN feature vector in current mode is generated by the array of absolute circuit 140 of the selected in-pixel processing unit 100, and the LGN feature vector in current mode is parallelly delivered as output of the in-pixel processing array 12.

There are two options for the output of the in-pixel processing array 12 off chip. The first one is analog parallel array off chip through block 905, and the second one is digital parallel array off chip through block 911.

At block 905, the output of the in-pixel processing array 12 from block 903 in analog current is parallelly delivered off chip through an analog array.

At block 907, the analog output of the in-pixel processing array 12 from block 903 in analog current will go through an analog to digital convertor (ADC) array to be digitized and parallelly delivered digitally to a digital array off chip of block 911. In order to obtain accurate digital output, a maximum current value Imax from the block 903 as a reference is necessary from block 907.

Figure 10:
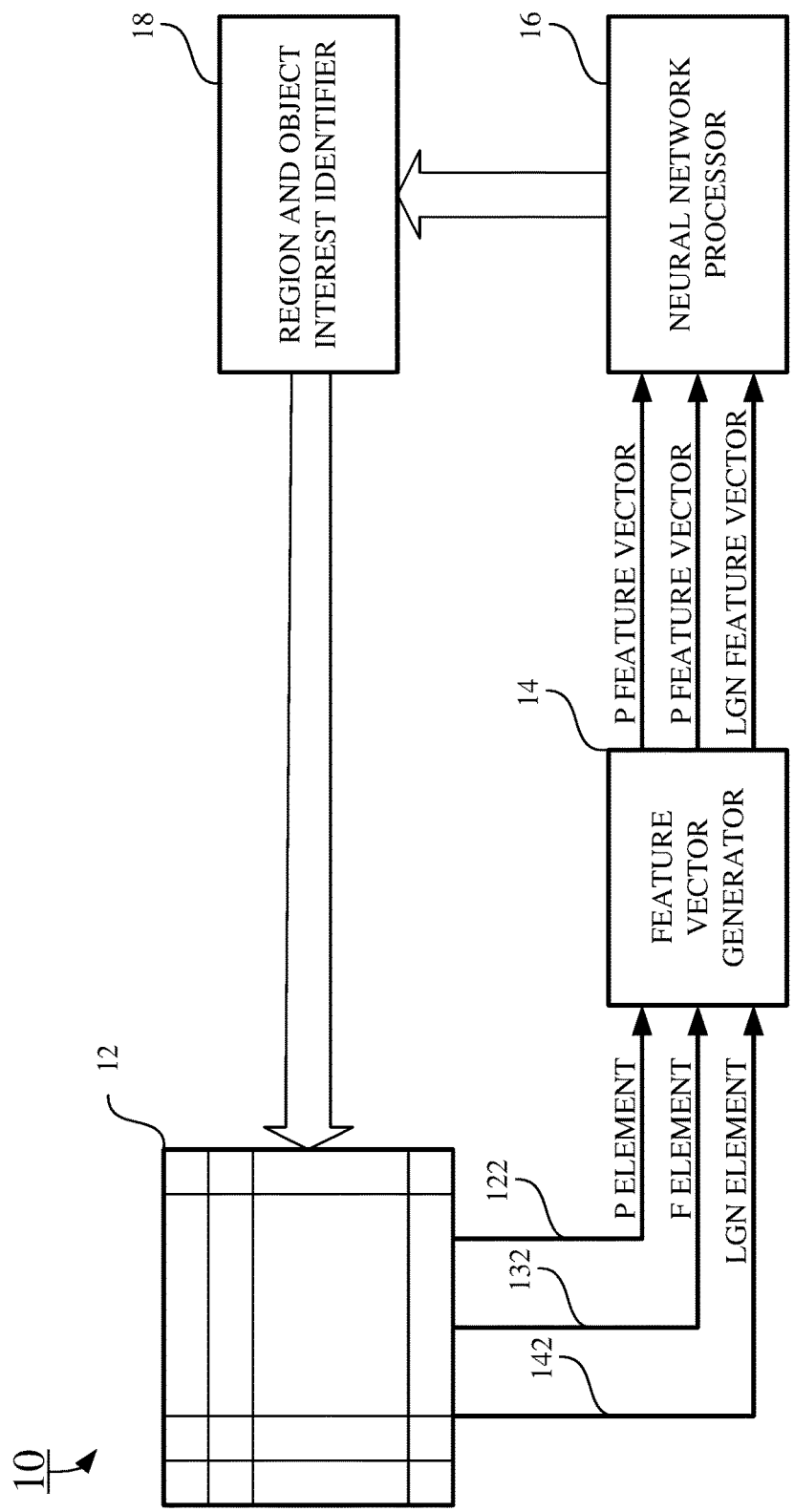
FIG. 10 illustrates a block diagram of a brain-like in-pixel intelligent processing system according to certain embodiments of the present disclosure.

In another aspect, as shown in FIG. 10, the present disclosure relates to a brain-like in-pixel intelligent processing system 10. In certain embodiments, the brain-like in-pixel intelligent processing system 10 includes: an in-pixel processing array 12, a feature vector generator 14, a neural network processor 16, and a region and object of interest identifier 18.

In certain embodiments, the in-pixel processing array 12 includes: a set of in-pixel processing units 100, a saccadic pixel selection circuit 1202. The saccadic pixel selection circuit 1202 includes: a saccadic pixel column selector 12022 and a saccadic pixel row selector 12024. The in-pixel processing array 12 forms an image acquisition and bio-inspired processing imager configured to processes raw gray information in a pixel level. An output of the in-pixel processing array 12 is from a set of selected in-pixel processing units 100 of the in-pixel processing array 12. The set of selected in-pixel processing units 100 of the in-pixel processing array 12 is selected through the saccadic pixel column selector 12022 and the saccadic pixel row selector 12024 according to a saccadic eye movement algorithm based on an acquired image.

In certain embodiments, as shown in FIG. 3, the in-pixel processing array 12 includes has N columns and M rows of in-pixel processing units 100, where N and M are positive integer, P(1, 1), P(1, 2), P(1, 3), . . . , and P(N, M). The in-pixel processing array 12 forms the image acquisition and bio-inspired processing imager configured to processes raw gray information in the pixel level.

In certain embodiments, as shown in FIG. 4, each of the in-pixel processing units 100 includes: a photogate sensor 110 for capturing a pixel of an image of an object and produces an $I_{out}$ current to the in-pixel processing array 12, an average circuit 120 for receiving and averaging Iot current from the in-pixel processing unit 100 and a set of neighboring in-pixel processing units 100 around the in-pixel processing unit 100, and an averaged $I_{out}$ current forms a periphery (P) element 122 of the in-pixel processing unit 100, the periphery (P) element 122 of the in-pixel processing unit 100 formed is used by the subtraction circuit 130 to generate a fovea (F) element 132 of the in-pixel processing unit 100, and the F element 132 of the in-pixel processing unit 100 generated in pixel level is sent to the absolute circuit 140 via pixel mapping to generate lateral geniculate nucleus (LGN) element 142 of the in-pixel processing unit 100. The in-pixel processing array 12 forms an image acquisition and bio-inspired processing imager configured to processes raw gray information in a pixel level. An output of the in-pixel processing array 12 is from a set of selected in-pixel processing units 100 of the in-pixel processing array 12 as shown in FIG. 3, and the set of selected in-pixel processing units 100 of the in-pixel processing array 12 is selected according to a saccadic eye movement algorithm based on an acquired image using the saccadic pixel column selector 12022 and the saccadic pixel row selector 12024.

The set of selected in-pixel processing units 100 has very sparse data as shown in FIG. 2, which is reduced to 60× compared with using full color pixels. Such an innovative approach requires much less computation power for processing and less data to communicate with other systems (Bandwidth reduction).

In certain embodiments, each of the set of selected in-pixel processing units 100 produces a periphery (P) element, a fovea (F) element, and a lateral geniculate nucleus (LGN) element of selected in-pixel processing unit 100, the feature vector generator 14 generates a P feature vector, an F feature vector, and an LGN feature vector of the in-pixel processing array 12 of the image of an object from the P element, the F element, and the LGN element of each of the set of selected in-pixel processing units 100 received, the neural network processor 16 receives and processes the P feature vector, the F feature vector, and the LGN feature vector of the in-pixel processing array 12, detects the object, recognizes the object, and determines the location of the object, and the region and object of interest identifier 18 provides feedback of the region and the object of interest to the in-pixel processing array 12 to improve the object detection and identification.

In certain embodiments, each selected in-pixel processing unit 100 uses the average circuit 120 to average the $I_{out}$ current from the photogate sensor 110 of the selected in-pixel processing unit 100 and $I_{out}$ current from photogate sensors 110 from a set of neighboring in-pixel processing unit 100 around the selected in-pixel processing unit 100 to generate a periphery (P) element 122 of the selected in-pixel processing unit 100.

In certain embodiments, the set of neighboring in-pixel processing unit 100 around the selected in-pixel processing unit 100 is centered at the selected in-pixel processing unit 100 in a form of sub-window array, as shown in FIG. 5. The sub-window array of the set of neighboring in-pixel processing units 100 around the selected in-pixel processing unit 100 may take the form of: (1) a circle as for the selected in-pixel processing unit 201, (2) an octagon 2021 as for the selected in-pixel processing unit 202, (3) an hexagon 2041 as for the selected in-pixel processing unit 204, and (4) a square as for the selected in-pixel processing units 203, 205, and 206.

In certain embodiments, the P element 122 in current mode of the selected in-pixel processing unit 100 from the average circuit 120 is parallelly delivered in an array form through a periphery sub-window array.

In certain embodiments, the F element 132 in current mode of the selected in-pixel processing unit 100 from the subtraction circuit 130 is parallelly delivered in an array form through a fovea sub-window array.

In one embodiment, the LGN element 142 in current mode of the selected in-pixel processing unit 100 from the absolute circuit 140 is parallelly delivered in an analog array form through a LGN feature sub-window array. In another embodiment, the LGN element 142 in current mode of the selected in-pixel processing unit 100 from the absolute circuit 140 is parallelly delivered off chip in a digital array form over an Analog to Digital Converter (ADC) array through the LGN feature sub-window array.

In certain embodiments, the feature vector generator 14 receives and processes the P element, the F element, and the LGN element from each of in-pixel processing units 100 of the in-pixel processing array 12 and generates the P feature vector, the F feature vector, and the LGN feature vector of the in-pixel processing array 12.

In certain embodiments, the neural network processor 16 receives and processes the P feature vector, the F feature vector, and the LGN feature vector of the in-pixel processing array 12 received according to certain brain-like intelligent processing algorithms to detect the object, to identify the object, and to determine the location of the object.

In certain embodiments, the region and object of interest identifier 18 identifies the region and object of interest from the object detected and identified by the neural network processor 16 and provides feedback of the identified region and object of interest and the processed P, F, and LGN feature vectors of the brain-like in-pixel intelligent processing system to the in-pixel processing array to improve the object detection and identification.

In yet another aspect, the present disclosure relates to a method of using a brain-like in-pixel intelligent processing system 10. In certain embodiments, the brain-like in-pixel intelligent processing system 10 is built on a semiconductor chip, and the brain-like in-pixel intelligent processing system 10 includes: an in-pixel processing array 12 configured to acquire raw gray information of the object, and to process the raw gray information acquired in a pixel level, a feature vector generator 14, a neural network processor 16, and a region and object of interest identifier 18. The in-pixel processing array 12 includes a set of in-pixel processing units 100, and a saccadic pixel selection circuit 1202. The saccadic pixel selection circuit 1202 includes: a saccadic pixel column selector 12022 and a saccadic pixel row selector 12024. The in-pixel processing array 12 forms an image acquisition and bio-inspired processing imager configured to processes raw gray information in a pixel level. An output of the in-pixel processing array 12 is from a set of selected in-pixel processing units 100 of the in-pixel processing array 12. The set of selected in-pixel processing units 100 of the in-pixel processing array 12 is selected through the saccadic pixel column selector 12022 and the saccadic pixel row selector 12024 according to a saccadic eye movement algorithm based on an acquired image. Each of the in-pixel processing units 100 includes a photogate sensor 110, an average circuit 120, a subtraction circuit 130, and an absolute circuit 140.

In certain embodiments, the method includes one of more of the following operations:
  exposing an object to the brain-like in-pixel intelligent processing system 10;
  producing, by the photogate sensor 110 of a set of selected in-pixel processing units 100 of the in-pixel processing array 12, an $I_{out}$ current of each selected in-pixel processing unit 100 in response to the exposure to the object, the set of selected in-pixel processing units 100 of the in-pixel processing array 12 is selected according to a saccadic eye movement algorithm based on an acquired image using the saccadic pixel column selector 12022 and the saccadic pixel row selector 12024;
  averaging, by the average circuit 120 of each of the set of selected in-pixel processing units 100, the $I_{out}$ current from the selected in-pixel processing unit 100 and a set of neighboring in-pixel processing units 100 around the selected in-pixel processing unit 100 to generate a periphery (P) element 122 of each selected in-pixel processing unit 100;
  subtracting, by the subtraction circuit 130 of each of the set of selected in-pixel processing units 100, the P element 122 from the each of the set of selected in-pixel processing units 100 to generate a corresponding fovea (F) element 132 of each selected in-pixel processing units 100;
  producing, by the absolute circuit 140 of each of the set of selected in-pixel processing units 100, a corresponding lateral geniculate nucleus (LGN) element 142 for each of the set of selected in-pixel processing units 100 from each of the corresponding F elements 122 of the set of selected in-pixel processing units 100;
  generating, by the feature vector generator 14 of the brain-like in-pixel intelligent processing system 10, a corresponding P feature vector, F feature vector, and LGN feature vector from each of the corresponding P elements 122, F elements 132, and LGN elements 142 of each of the set of selected in-pixel processing units 100;
  processing, by the neural network processor 16, the P feature vector, the F feature vector, and the LGN feature vector of the set of selected in-pixel processing units 100 to detect the object, identify the object, and obtain the location of the object;
  identifying, by the region and object of interest identifier 18, the region and object of interest from the processed P, F, and LGN feature vectors of the brain-like in-pixel intelligent processing system 10; and
  transmitting, by the region and object of interest identifier 18, the identified region and object of interest and the processed P, F, and LGN feature vectors of the brain-like in-pixel intelligent processing system 10 back to in-pixel processing array 12 to improve the object detection and identification.

Figure 11:
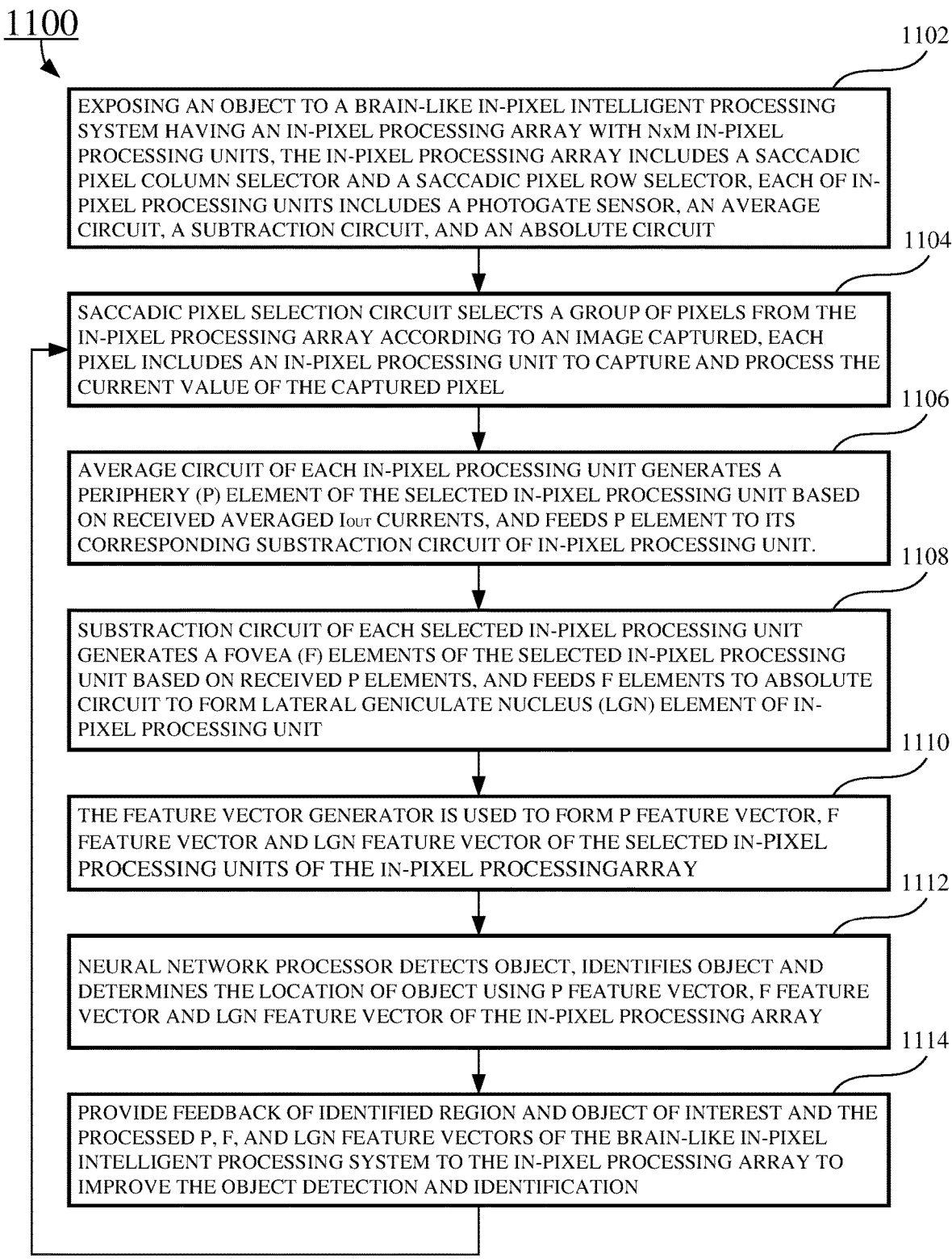
FIG. 11 shows a flow chart of a method of using the brain-like in-pixel intelligent processing system according to certain embodiments of the present disclosure.

Referring now to FIG. 11, a flow chart of a method 1100 of using the brain-like in-pixel intelligent processing system 10 is shown according to certain embodiments of the present disclosure.

At block 1102, exposing an object to the brain-like in-pixel intelligent processing system 10, the brain-like in-pixel intelligent processing system 10 includes an in-pixel processing array 12 having N×M in-pixel processing units 100, and each of the in-pixel processing units 100 includes a set of input channels, a photogate sensor 110, an average circuit 120, a subtraction circuit 130, and an absolute circuit 140;

At block 1104, the saccadic pixel selection circuit 1202 of the in-pixel processing array 12 selects a group of pixels from the in-pixel processing array according to an image captured above, each pixel includes an in-pixel processing unit to capture and process the current value of the captured pixel;

At block 1106, the average circuit 120 of each in-pixel processing unit generates a periphery (p) element of the in-pixel processing unit based on received averaged $I_{out}$ currents, the averaged $I_{out}$ currents is from the $I_{out}$ current from the selected in-pixel processing unit and a set of neighboring in-pixel processing units around the selected in-pixel processing unit, and the averaged $I_{out}$ currents form an P element 122 and feed to its corresponding subtraction circuit 130 of the selected in-pixel processing units;

At block 1108, the subtraction circuit 130 of each selected in-pixel processing unit generates a fovea (F) element of the selected in-pixel processing unit based on received P elements, and feeds F elements to the absolute circuit 140 of each selected in-pixel processing unit to form lateral geniculate nucleus (LGN) elements of the selected in-pixel processing units;

At block 1110, the feature vector generator 14 is used to form P feature vectors, F feature vectors and LGN feature vectors of the selected in-pixel processing units of the in-pixel processing array 12, based on the P elements, the F elements, and the LGN elements the set of selected in-pixel processing units of the in-pixel processing array 12.

At block 1112, the neural network processor 16 detects the object, identifies the object, and determines the location of the object based on the P feature vector, the F feature vector, and the LGN feature vector received from the in-pixel processing array 12; and At block 1114, the region and object of interest identifier 18 identifies a region and object of interest from the object detected and identified by the neural network processor 16, and provides feedback of the identified region and object of interest and the processed P, F, and LGN feature vectors of the brain-like in-pixel intelligent processing system to the in-pixel processing array 12 to improve the object detection and identification.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An in-pixel processing array for a brain-like in-pixel intelligent processing system, comprising:
a plurality of in-pixel processing units, a saccadic pixel column selector, and a saccadic pixel row selector, wherein the saccadic pixel column selector and the saccadic pixel row selector are used for selecting output from selected in-pixel processing units according to a saccadic eye movement algorithm based on an acquired image, wherein the in-pixel processing array forms an image acquisition and bio-inspired processing imager configured to processes raw gray information in a pixel level; wherein an output of the in-pixel processing array is from a plurality of selected in-pixel processing units of the in-pixel processing array, wherein the plurality of selected in-pixel processing units of the in-pixel processing array is selected according to the saccadic eye movement algorithm based on the acquired image.

2. The in-pixel processing array according to claim 1, wherein each of the in-pixel processing units comprises:
a photogate sensor, wherein the photogate sensor captures a pixel of the image of an object corresponding to the in-pixel processing unit and produces an $I_{out}$ current of the in-pixel processing unit to the in-pixel processing array;
an average circuit, wherein the average circuit receives and averages $I_{out}$ current from the in-pixel processing unit and a plurality of neighboring in-pixel processing units, and the averaged $I_{out}$ current from the in-pixel processing unit and the plurality of neighboring in-pixel processing units forms a periphery (P) element of the in-pixel processing unit;
a subtraction circuit, wherein the periphery (P) element formed is used by the subtraction circuit to generate a fovea (F) element of the in-pixel processing unit; and
an absolute circuit, wherein F element generated in pixel level is sent to the absolute circuit via pixel mapping to generate lateral geniculate nucleus (LGN) element of the in-pixel processing unit.

3. The in-pixel processing array according to claim 2, wherein the plurality of in-pixel processing units comprises: N columns, and M rows of in-pixel processing units, where N is a positive integer, and M is a positive integer.

4. The in-pixel processing array according to claim 3, wherein plurality of neighboring in-pixel processing units of the in-pixel processing unit is centered at the selected in-pixel processing unit in a form of sub-window array, and the sub-window array of the plurality of neighboring in-pixel processing units of the selected in-pixel processing unit comprises: a circle, a square, a hexagon, and an octagon.

5. The in-pixel processing array according to claim 4, wherein each of the in-pixel processing units comprises a plurality of input channels, and the plurality of input channels of the in-pixel processing unit comprises: a first input channel from the in-pixel processing unit, a second input channel from the first neighboring in-pixel processing unit, a third input channel from the second neighboring in-pixel processing unit, . . . , and a Q-th input channel from the (Q−1)-th neighboring in-pixel processing unit.

6. The in-pixel processing array according to claim 5, wherein the P element in current mode of the selected in-pixel processing unit from the average circuit is parallelly delivered in an array form through a periphery sub-window array.

7. The in-pixel processing array according to claim 6, wherein the F element in current mode of the selected in-pixel processing unit from the subtraction circuit is parallelly delivered in an array form through a fovea sub-window array.

8. The in-pixel processing array according to claim 7, wherein the LGN element in current mode of the selected in-pixel processing unit from the absolute circuit is parallelly delivered off chip in an analog array form through an LGN feature sub-window array.

9. The in-pixel processing array according to claim 8, wherein the LGN element in current mode of the selected in-pixel processing unit from the absolute circuit is parallelly delivered off chip in a digital array form over an Analog to Digital Converter (ADC) array through an LGN feature sub-window array.

10. A brain-like in-pixel intelligent processing system, comprising:
an in-pixel processing array, wherein the in-pixel processing array comprises a plurality of in-pixel processing units, a saccadic pixel column selector, and a saccadic pixel row selector, wherein the saccadic pixel column selector and the saccadic pixel row selector are used for selecting output from selected in-pixel processing units according to a saccadic eye movement algorithm based on an acquired image, and each of the in-pixel processing units comprises:
a photogate sensor, wherein the photogate sensor captures a pixel of an image of an object and produces an $I_{out}$ current to the in-pixel processing array;
an average circuit, wherein the average circuit receives and averages $I_{out}$ current from the in-pixel processing unit and a plurality of neighboring in-pixel processing units around the in-pixel processing unit and an averaged $I_{out}$ current forms a periphery (P) element of the in-pixel processing unit;
a subtraction circuit, wherein the periphery (P) element of the in-pixel processing unit formed is used by the subtraction circuit to generate a fovea (F) element of the in-pixel processing unit; and
an absolute circuit, wherein the F element of the in-pixel processing unit generated in pixel level is sent to the absolute circuit via pixel mapping to generate lateral geniculate nucleus (LGN) element of the in-pixel processing unit; and
wherein the in-pixel processing array forms an image acquisition and bio-inspired processing imager configured to processes raw gray information in a pixel level; wherein an output of the in-pixel processing array is from a plurality of selected in-pixel processing units of the in-pixel processing array, and the plurality of selected in-pixel processing units of the in-pixel processing array is selected according to the saccadic eye movement algorithm based on the acquired image;

a feature vector generator, wherein the feature vector generator receives and processes the P element, the F element, and the LGN element from each of selected in-pixel processing units of the in-pixel processing array, and generates the P feature vector, the F feature vector, and the LGN feature vector of the in-pixel processing array;

a neural network processor, wherein the neural network processor receives and processes the P feature vector, the F feature vector, and the LGN feature vector of the in-pixel processing array received;

a region and object of interest identifier, wherein the region and object of interest identifier identifies the region and object of interest from the processed P, F, and LGN feature vectors of the in-pixel processing array, and wherein each of the plurality of selected in-pixel processing units produces a periphery (P) element, a fovea (F) element, and a lateral geniculate nucleus (LGN) element of the in-pixel processing unit, the feature vector generator generates a P feature vector, an F feature vector, and an LGN feature vector of the in-pixel processing array of the image of the object from the P element, the F element, and the LGN element of each of the plurality of selected in-pixel processing units received, the neural network processor receives and processes the P feature vector, the F feature vector, and the LGN feature vector of the in-pixel processing array, detects the object, recognizes the object, and determines the location of the object, and the region and object of interest identifier provides feedback of the region and the object of interest to the in-pixel processing array to improve the object detection and identification.

11. The brain-like in-pixel intelligent processing system according to claim 10, wherein each of the selected in-pixel processing unit uses the average circuit to average the $I_{out}$ current from the photogate sensor of the selected in-pixel processing unit and Iot current from photogate sensors from a plurality of neighboring in-pixel processing unit around the selected in-pixel processing unit to generate a periphery (P) element of the selected in-pixel processing unit, the plurality of neighboring in-pixel processing unit around the selected in-pixel processing unit is centered at the selected in-pixel processing unit in a form of sub-window array, and the sub-window array of the plurality of neighboring in-pixel processing units around the selected in-pixel processing unit comprises: a circle, a square, a hexagon, and an octagon.

12. The brain-like in-pixel intelligent processing system according to claim 11, wherein the P element in current mode of the selected in-pixel processing unit from the average circuit is parallelly delivered in an array form through a periphery sub-window array.

13. The brain-like in-pixel intelligent processing system according to claim 12, wherein the F element in current mode of the selected in-pixel processing unit from the subtraction circuit is parallelly delivered in an array form through a fovea sub-window array.

14. The brain-like in-pixel intelligent processing system according to claim 13, wherein the LGN element in current mode of the selected in-pixel processing unit from the absolute circuit is parallelly delivered off chip in an analog array form through an LGN feature sub-window array.

15. The brain-like in-pixel intelligent processing system according to claim 13, wherein the LGN element in current mode of the selected in-pixel processing unit from the absolute circuit is parallelly delivered off chip in a digital array form over an Analog to Digital Converter (ADC) array through an LGN feature sub-window array.

16. A method of using a brain-like in-pixel intelligent processing system, comprising:

exposing an object to the brain-like in-pixel intelligent processing system, wherein the brain-like in-pixel intelligent processing system comprises: an in-pixel processing array configured to acquire raw gray information of the object and to process the raw gray information acquired in a pixel level, a feature vector generator, a neural network processor, and a region and object of interest identifier, wherein the in-pixel processing array comprises a plurality of in-pixel processing units, a saccadic pixel column selector, and a saccadic pixel row selector for selecting output from selected in-pixel processing units according to a saccadic eye movement algorithm based on an acquired image, and each of the plurality of in-pixel processing units comprises a photogate sensor, an average circuit, a subtraction circuit, and an absolute circuit;

producing, by the photogate sensor of a plurality of selected in-pixel processing units, an $I_{out}$ current of each selected in-pixel processing unit in response to the exposure to the object, wherein the plurality of selected in-pixel processing units of the in-pixel processing array is selected according to the saccadic eye movement algorithm based on the acquired image;

averaging, by the average circuit of each of the plurality of selected in-pixel processing units, the $I_{out}$ current from the selected in-pixel processing unit and a plurality of neighboring in-pixel processing units around the selected in-pixel processing unit to generate a periphery (P) element of each selected in-pixel processing unit;

subtracting, by the subtraction circuit of each of the plurality of selected in-pixel processing units, the P element from the each of the plurality of selected in-pixel processing units to generate a corresponding fovea (F) element for each of the plurality of selected in-pixel processing units;

producing, by the absolute circuit of each of the plurality of selected in-pixel processing units, a corresponding lateral geniculate nucleus (LGN) element for each of the plurality of selected in-pixel processing units from each of the corresponding F elements of the plurality of selected in-pixel processing units;

generating, by the feature vector generator of the brain-like in-pixel intelligent processing system, a corresponding P feature vector, F feature vector, and LGN feature vector from each of the corresponding P elements, F elements, and LGN elements of each of the plurality of selected in-pixel processing units;

processing, by the neural network processor, the P feature vector, the F feature vector, and the LGN feature vector of the plurality of selected in-pixel processing units to detect the object, to identify the object, and obtain the location of the object;

identifying, by the region and object of interest identifier, the region and object of interest from the processed P, F, and LGN feature vectors of the brain-like in-pixel intelligent processing system; and transmitting, by the region and object of interest identifier, the identified region and object of interest and the processed P, F, and LGN feature vectors of the brain-like in-pixel intelligent processing system back to in-pixel processing array to improve the object detection and identification.

17. The method according to claim 16, wherein the brain-like in-pixel intelligent processing system comprises:

the in-pixel processing array, wherein the in-pixel processing array comprises a plurality of in-pixel processing units, a saccadic pixel column selector, and a saccadic pixel row selector, wherein the saccadic pixel column selector and the saccadic pixel row selector are used for selecting output from selected in-pixel processing units according to the saccadic eye movement algorithm based on the acquired image, and each of the in-pixel processing units comprises:

the photogate sensor, wherein the photogate sensor captures a pixel of an image of an object and produces an $I_{out}$ current to the in-pixel processing array;

the average circuit, wherein the average circuit receives and averages $I_{out}$ current from the in-pixel processing unit and a plurality of neighboring in-pixel processing units around the in-pixel processing unit and an averaged $I_{out}$ current forms a periphery (P) element;

the subtraction circuit, wherein the periphery (P) element generated is used by the subtraction circuit to generate a fovea (F) element of the in-pixel processing unit; and the absolute circuit, wherein the F element generated in pixel level is sent to the absolute circuit via pixel mapping to generate lateral geniculate nucleus (LGN) element of the in-pixel processing unit; and wherein the in-pixel processing array forms an image acquisition and bio-inspired processing imager configured to processes raw gray information in a pixel level;

wherein an output of the in-pixel processing array is from a plurality of selected in-pixel processing units of the in-pixel processing array, and the plurality of selected in-pixel processing units of the in-pixel processing array is selected according to the saccadic eye movement algorithm based on the acquired image;

the feature vector generator, wherein the feature vector generator receives and processes the P element, the F element, and the LGN element from each of selected in-pixel processing units of the in-pixel processing array, and generates the P feature vector, the F feature vector, and the LGN feature vector of the in-pixel processing array;

the neural network processor, wherein the neural network processor receives and processes the P feature vector, the F feature vector, and the LGN feature vector of the in-pixel processing array received;

the region and object of interest identifier, wherein the region and object of interest identifier identifies the region and object of interest from the processed P, F, and LGN feature vectors of the in-pixel processing array, and wherein each of the plurality of selected in-pixel processing units produces a periphery (P) element, a fovea (F) element, and a lateral geniculate nucleus (LGN) element for the selected in-pixel processing unit, the feature vector generator generates a P feature vector, an F feature vector, and an LGN feature vector of the in-pixel processing array of the image of the object from the P element, the F element, and the LGN element of each of the plurality of selected in-pixel processing units received, the neural network processor receives and processes the P feature vector, the F feature vector, and the LGN feature vector of the in-pixel processing array, detects the object, recognizes the object, and determines the location of the object, and the region and object of interest identifier provides feedback of the region and the object of interest to the in-pixel processing array to improve the object detection and identification.

18. The method according to claim 17, wherein each of the selected in-pixel processing unit uses the average circuit to average the $I_{out}$ current from the photogate sensor of the selected in-pixel processing unit and $I_{out}$ current from photogate sensors from a plurality of neighboring in-pixel processing unit of the selected in-pixel processing unit to generate a periphery (P) element of the selected in-pixel processing unit.

19. The method according to claim 18, wherein plurality of neighboring in-pixel processing unit around the selected in-pixel processing unit is centered at the selected in-pixel processing unit in a form of sub-window array.

20. The method according to claim 19, wherein the sub-window array of the plurality of neighboring in-pixel processing units around the selected in-pixel processing unit comprises: a circle, a square, a hexagon, and an octagon.

* * * * *